(12) United States Patent
Tan et al.

(10) Patent No.: US 9,470,558 B2
(45) Date of Patent: Oct. 18, 2016

(54) ENCODER ALIGNMENT STRUCTURE

(71) Applicant: Avago Technologies General IP (Singapore) Pte. Ltd., Singapore (SG)

(72) Inventors: Siow Ming Tan, Penang (MY); Kek Leong Yap, Penang (MY); Chong Hon Lim, Kedah (MY); Andrew Tuck Loon Kuan, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 143 days.

(21) Appl. No.: 14/488,797

(22) Filed: Sep. 17, 2014

(65) Prior Publication Data

US 2016/0076917 A1   Mar. 17, 2016

(51) Int. Cl.
*G01D 5/347* (2006.01)

(52) U.S. Cl.
CPC .................. *G01D 5/3473* (2013.01)

(58) Field of Classification Search
CPC ........ G01D 5/34; G01D 5/341; G01D 5/342; G01D 5/344; G01D 5/345; G01D 5/347; G01D 5/34707; G01D 5/34715; G01D 5/34723; G01D 5/3473; G01D 5/34738; G01D 5/34746; G01D 5/34753; G01D 5/34761; G01D 5/34769; G01D 5/34776; G01D 5/34784; G01D 5/3479
USPC ........... 250/231.1–231.18; 33/706, 707, 1 N, 33/1 PT; 341/13, 14; 356/616, 617
See application file for complete search history.

(56) References Cited

U.S. PATENT DOCUMENTS

| | | | | |
|---|---|---|---|---|
| 5,576,905 A | * | 11/1996 | Garcia | G11B 15/54 360/73.14 |
| 6,608,300 B2 | * | 8/2003 | Meschko | G01D 5/34738 250/231.13 |
| 7,601,948 B1 | * | 10/2009 | Setbacken | G01D 5/34738 250/231.13 |
| 8,471,554 B2 | | 6/2013 | Lee | |
| 2009/0090851 A1 | * | 4/2009 | Wong | G01D 5/3473 250/231.13 |

OTHER PUBLICATIONS

"Renco RCM21/Renco RM21", Renco Release No. 13677, Document No. D00548181-00-A-01, Jun. 20, 2006, 3 pages.
"Series M21 Modular Incremental Encoders", Dynapar Industries Controls, 2014, pp. 64-65.

* cited by examiner

*Primary Examiner* — Renee Chavez (57) ABSTRACT

An encoder system comprising an encoder assembly and an encoder alignment structure is disclosed. The encoder assembly may include at least a coding member, a hub, and a housing. The encoder alignment structure may comprise a major surface, a plurality of catches, and a recessed region. The major surface may be coupled with the housing to substantially enclose the hub and the coding member. The plurality of catches may be disposed around the periphery of the major surface and may be configured to secure the encoder alignment structure to the housing. The recessed region of the major surface may be converging from the periphery of the major surface between two of the plurality of catches towards the hub so as to provide access for a user to adjust the hub around the axis of rotation.

20 Claims, 10 Drawing Sheets

ENCODER ALIGNMENT STRUCTURE

BACKGROUND

Encoders may be configured to measure position, velocity or acceleration of a component in a system. Encoders may be widely used in the field of industrial automation, such as robotics, automatic machines, or other machineries. Encoders may also be commonly used in consumer products, such as printers.

For industrial use, encoders may offer sensing and measuring capability that enable closed-loop feedback in motor control systems. Encoders may also be used in Brushless Direct Current (herein after referred to as "BLDC") motors. A BLDC rotor of the BLDC motor may be made of permanent magnets with a combination of 2, 3, or 4 pole pairs. Commutation of a brushless DC motor may be dependent on the position of the rotor. A feedback device such as an encoder may be essential to be attached to the BLDC motor shaft to indicate the current rotor position to a controller.

While using encoders in these applications provide a clear advantage, some challenges may remain in particular in the alignment of the encoder to the motor or component being measured.

BRIEF DESCRIPTION OF THE DRAWINGS

Illustrative embodiments by way of examples, not by way of limitation, are illustrated in the drawings. Throughout the description and drawings, similar reference numbers may be, but not necessarily, used to identify similar elements. The drawings are for illustrative purpose to assist understanding and may not necessarily be drawn per actual scale.

DETAILED DESCRIPTION

Figure 1A:
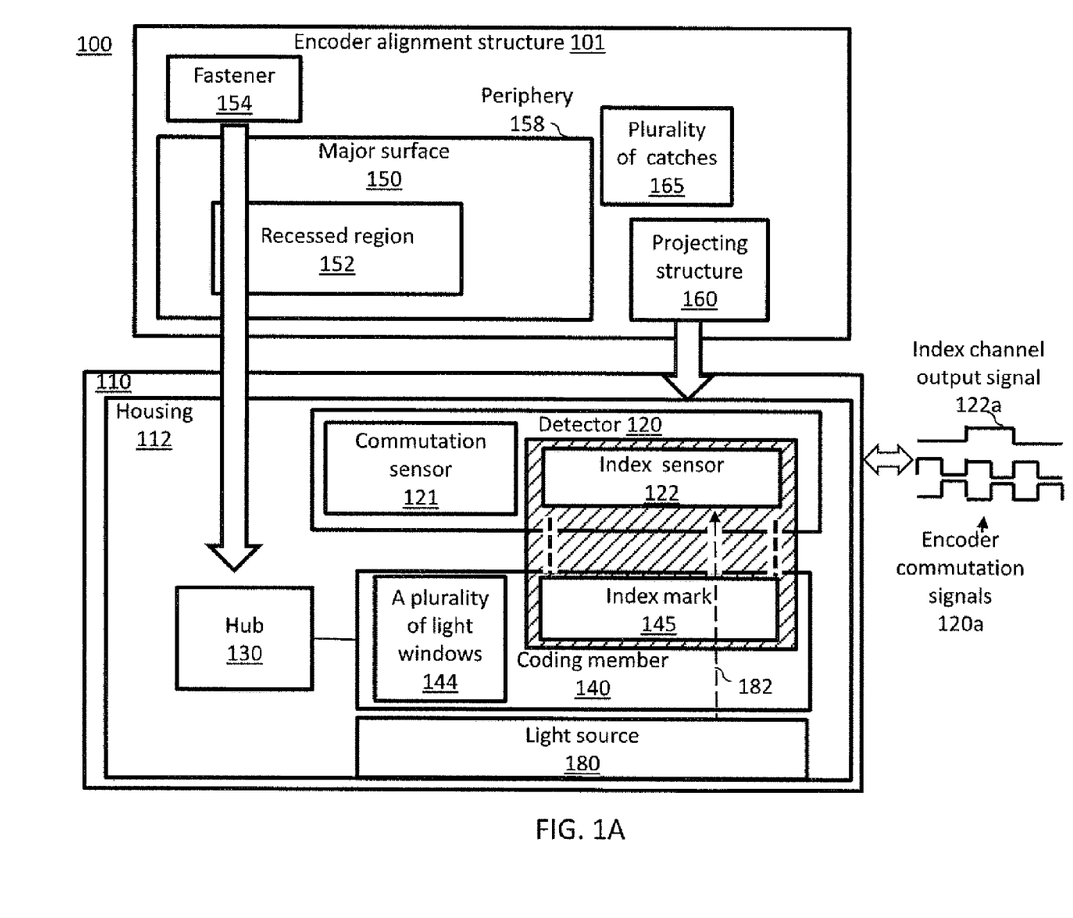
FIG. 1A illustrates a block diagram of an encoder system.
Figure 1B:
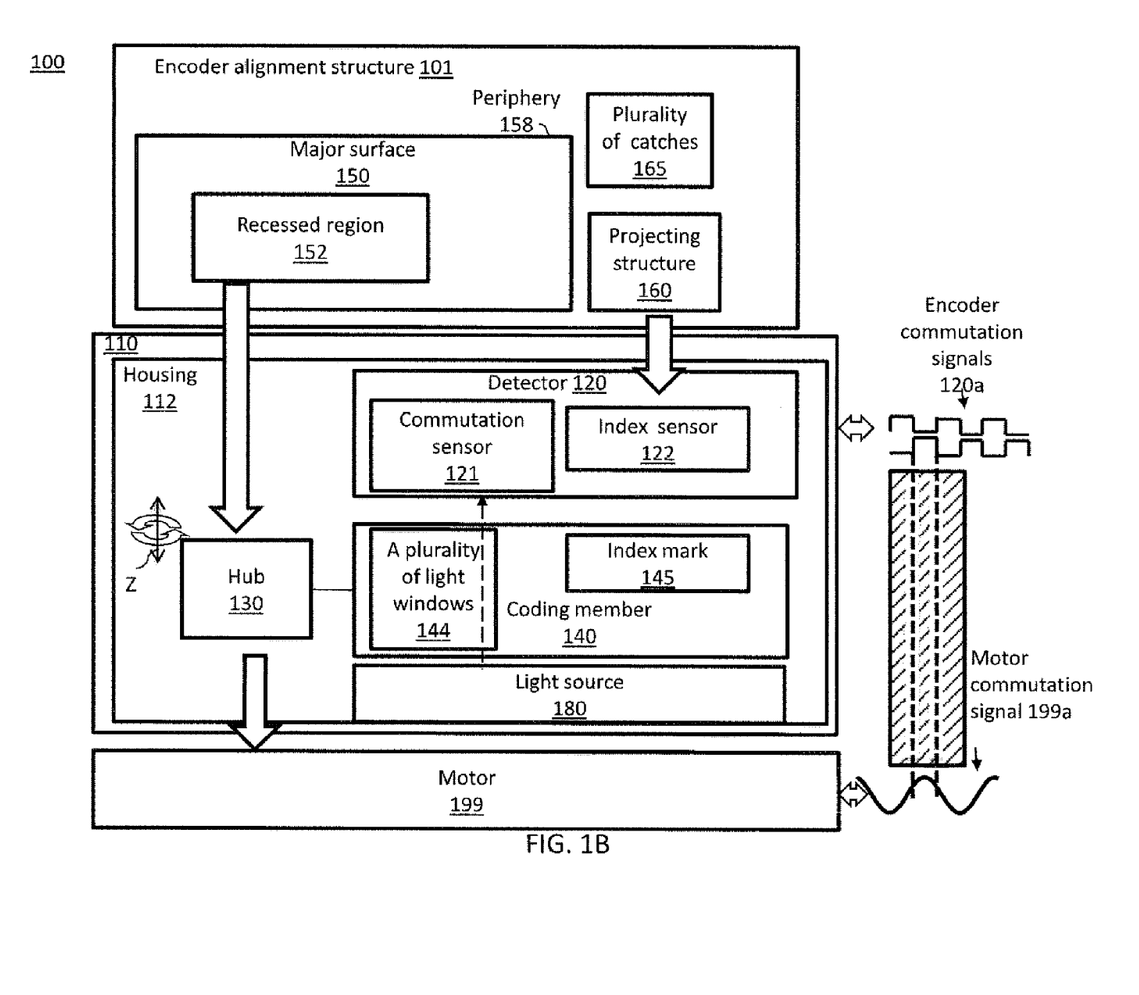
FIG. 1B illustrates a block diagram of the encoder system illustrated in FIG. 1A with a motor.

FIGS. 1A-1B illustrate block diagrams of an encoder system 100. The encoder system 100 may comprise an encoder assembly 110 and an encoder alignment structure 101. The encoder assembly 110 may comprise a housing 112, a hub 130, a coding member 140, a light source 180 and a detector 120.

The coding member 140 may be a code wheel or a linear code strip, or any other similar configurations that may be required or desired in a particular application. The coding member 140 may be coupled to the hub 130. The coding member 140 may have a plurality of light windows 144. The coding member 140 may further comprise an index mark 145. The index mark 145 may be presented for detection by the detector 120 once for every mechanical rotation of the coding member 140. The index mark 145 may be used to mark a single absolute position of the coding member 140. The index mark 145 may also serve as a reference point to determine a rotary position of the coding member 140.

The light source 180 may be configured to emit light 182 to the plurality of light windows 144 and the index mark 145 of the coding member 140. The light source 180 may be an LED, a laser or similar light source capable of emitting light. In one embodiment, the encoder assembly 110 may be a reflective encoder, in which the coding member 140 may reflect the light 182 from the light source 180 to the detector 120. In another embodiment, the encoder assembly 110 may be a transmissive encoder, in which the coding member 140 may transmit the light 182 from the light source 180 to the detector 120.

The hub 130 may be configured to rotate around an axis of rotation Z. The coding member 140 may rotate with the hub 130 when the hub 130 rotates. The detector 120 may comprise an index sensor 122. The index sensor 122 may be a photo sensor, photo diode or any other type of sensor that may convert light energy to electric energy. The index sensor 122 may be configured to generate an index channel output signal 122a in response to the reflected or transmitted light 182 from the index mark 145.

In one embodiment, the encoder assembly 110 may be a six-channel encoder. The detector 120 may comprise a commutation sensor 121. The commutation sensor 121 may be configured to generate encoder commutation signals 120a when the light source 180 generates the light 182 through the plurality of light windows 144. The encoder assembly 110 may be configured to measure a velocity of a motor 199. The motor 199 may be a Brushless DC motor (herein after referred to as "BLOC motor").

In an assembly process of the six-channel encoder to the BLDC motor, it may be necessary to align the encoder commutation signal 120a of the encoder assembly 110 with motor commutation signal 199a of the BLDC motor. The index channel output signal 122a generated by the index sensor 122 may be used as a reference signal to align the encoder commutation signal 120a of the encoder assembly 110 to the motor commutation signal 199a of the BLDC motor.

The encoder alignment structure 101 may comprise a major surface 150, a plurality of catches 165, a fastener 154 and a projecting structure 160. The major surface 150 may comprise a periphery 158 and a recessed region 152. The major surface 150 may be coupled with the housing 112 to substantially enclose the hub 130 and the coding member 140. The plurality of catches 165 may be disposed around the periphery 158 of the major surface 150. The plurality of catches 165 may be configured to secure the encoder alignment structure 101 to the housing 112. The recessed region 152 of the major surface 150 may be converging from the periphery 158 of the major surface 150 between two of the plurality of catches 165 towards the hub 130 so as to provide access for a user to adjust the hub 130 around the axis of rotation Z during the assembly process of the encoder assembly 110 to the motor 199.

The fastener 154 may be a screw or a bolt or similar structure to join things together. The fastener 154 may be configured to engage the hub 130 and the recessed region 152 when the index sensor 122 is aligned with the index mark 145. By using the fastener 154 to engage the hub 130 and the recessed region 152, the alignment between the index sensor 122 and the index mark 145 may be secured. Securing the hub 130 and the recessed region 152 may be particularly useful during transportation of the encoder system 100, where vibrations may disrupt the position of the hub 130 and the coding member 140. By securing the hub 130 and the recessed region 152, misalignment between the index mark 145 and the index sensor 122 may be prevented.

In an assembly process, the encoder assembly 110 with the encoder alignment structure 101 may be coupled to the motor 199. The user may remove the fastener 154 once the encoder assembly 110 is secured to the motor 199. The user may then fine tune a position of the hub 130 around the axis of rotation Z through the recessed region 152 of the encoder alignment structure 101 so as to align the encoder commutation signals 120a with the motor commutation signal 199a. Once the alignment is achieved, the user may then use the fastener 154 to secure the hub 130 to a motor shaft (not shown) of the motor 199 and remove the encoder alignment structure 101.

Figure 2:
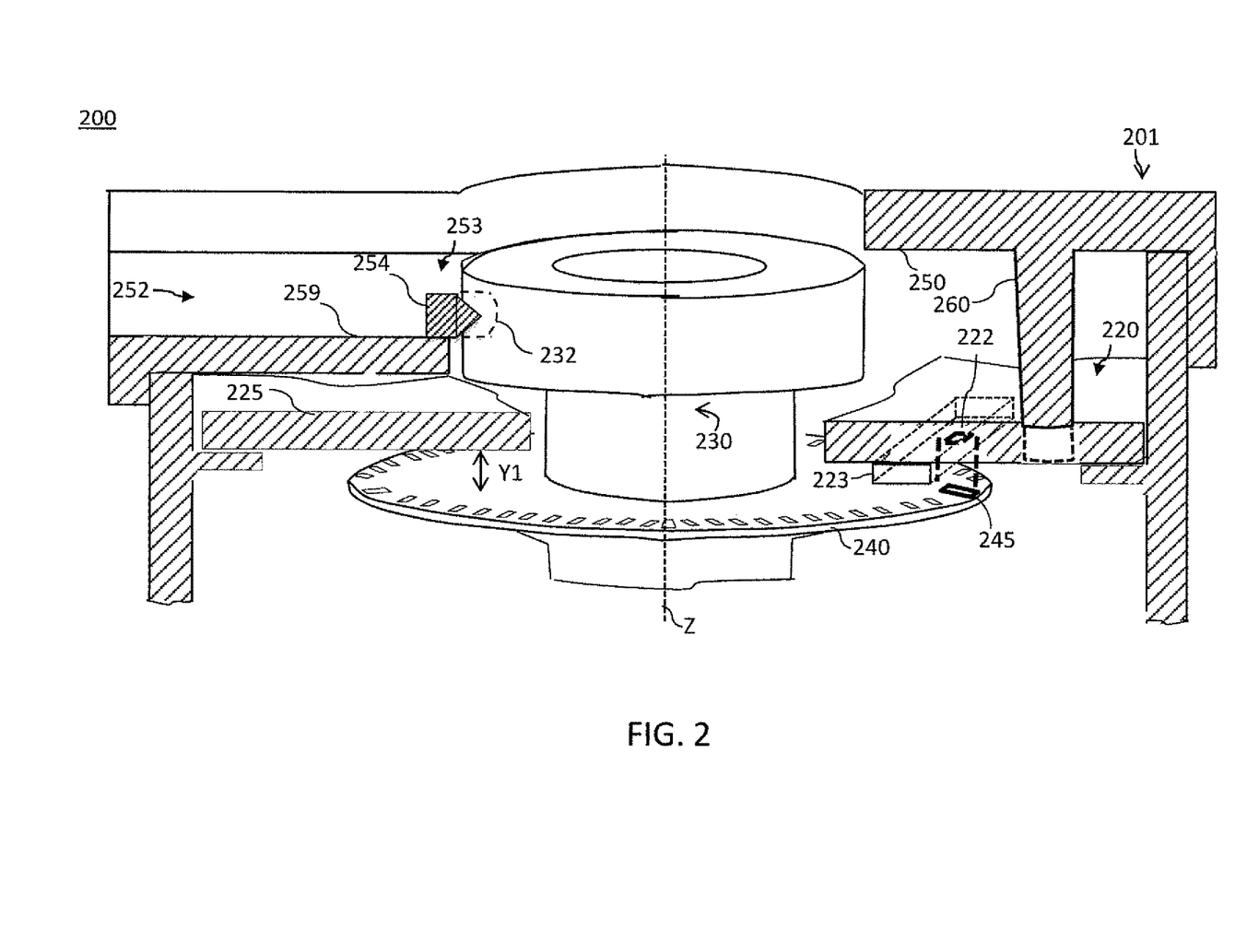
FIG. 2 illustrates a simplified perspective sectional view of an encoder system.

FIG. 2 illustrates a simplified perspective sectional view of an encoder system 200. The encoder system 200 may comprise a coding member 240, a hub 230, a detector 220, an index sensor 222 of the detector 220, an index mark 245 of the coding member 240, and an encoder alignment structure 201. The encoder alignment structure 201 may comprise a recessed region 252, a fastener 254, a major surface 250 and a projecting structure 260. All the components of the encoder system 200 that are in common with the components of the encoder system 100 may be identical or may have similar characteristics.

The projecting structure 260 may extend from the major surface 250 of the encoder alignment structure 201. The projecting structure 260 may be configured to engage the detector 220 thereby causing the index sensor 222 to align relative to the index mark 245. The recessed region 252 of the major surface 250 may also be aligned with the hub 230 so that the index sensor 222 is aligned with the index mark 245.

The hub 230 may be configured to rotate along an axis of rotation Z. The hub 230 may comprise a bore 232. The recessed region 252 of the major surface 250 may comprise an opening 253. The opening 253 may be adjacent to the hub 230. The bore 232 may be arranged to coincide with the opening 253 of the recessed region 252 when the index sensor 222 is aligned with the index mark 245. The fastener 254 may be configured to engage the hub 230 and the recessed region 252 when the index sensor 222 is aligned with the index mark 245.

The fastener 254 may also be configured to engage the hub 230 and the recessed region 252 so that the coding member 240 may be separated by a gap Y1 parallel to the axis of rotation Z from the detector 220. The gap Y1 between the detector 220 and the coding member 240 may be useful in protecting the coding member 240 from directly contacting the detector 220. When the coding member 240 is directly contacting the detector 220, the coding member 240 may suffer from scratches and contamination. Maintaining the gap Y1 with the fastener 254 may be particularly useful during the transportation of the encoder system 200 where vibrations may be present and alter the positions of the detector 220 and the coding member 240.

In one embodiment, the recessed region 252 may comprise a recessed surface 259. The recessed surface 259 may be substantially parallel to the major surface 250. The fastener 254 may be configured to engage the recessed surface 259 and the bore 232 when the index mark 245 is aligned with the index sensor 222.

The detector 220 may comprise a printed circuit board 225. The recessed region 252 may be adjacent to the printed circuit board 225 but distanced away from the coding member 240. The detector 220 may comprise a detector die 223. The index sensor 222 may form a portion of the detector die 223. The fastener 254 may be configured to engage the recessed region 252 and the hub 230 when the detector die 223 is disposed adjacent to the index mark 245.

Figure 3:
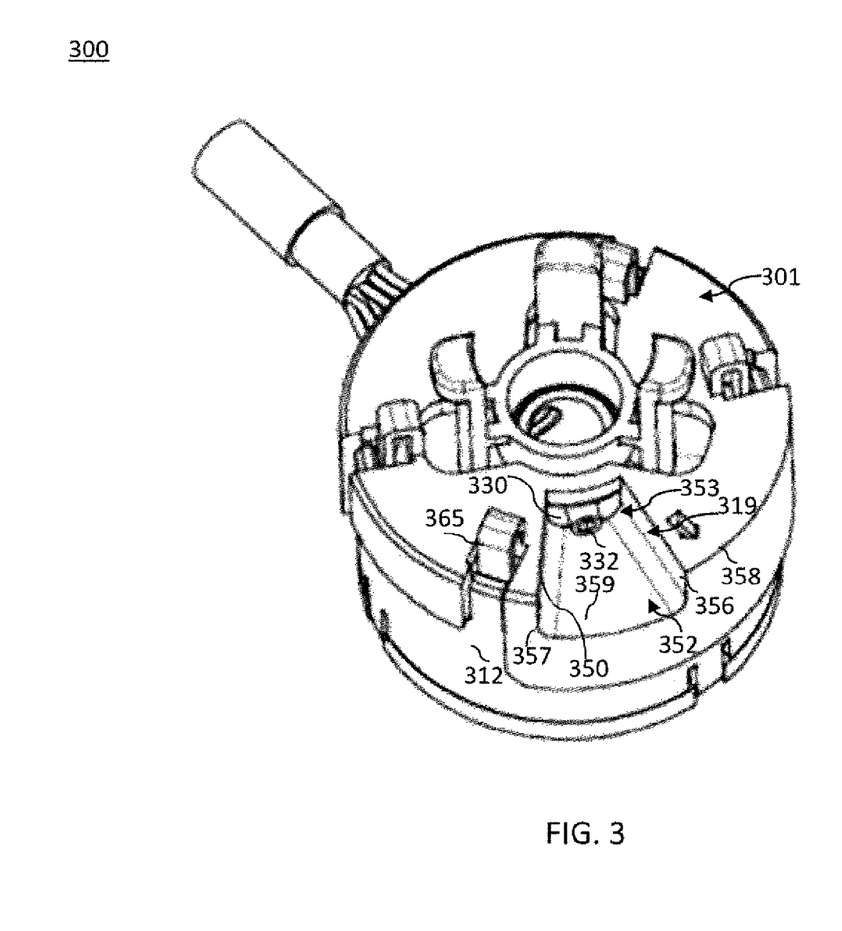
FIG. 3 illustrates a perspective view of an encoder system.

FIG. 3 illustrates a perspective view of an encoder system 300. The encoder system 300 may comprise an encoder alignment structure 301. All the components of the encoder system 300 that are in common with the components of the encoder systems 100, 200 may be identical or may have similar characteristics.

The encoder alignment structure 301 may comprise a plurality of catches 365, a perimeter 358 and a recessed region 352. The plurality of catches 365 may be disposed around the perimeter 358 of the encoder alignment structure 301. The plurality of catches 365 may be configured to secure the encoder alignment structure 301 to a housing 312. In the embodiment shown in FIG. 3, the encoder alignment structure 301 may comprise four members of the plurality of catches 365. In another embodiment, the encoder alignment structure 301 may comprise three members of the plurality of catches 365.

The recessed region 352 may be disposed between two of the plurality of catches 365. The recessed region 352 may comprise a recessed surface 359 and two walls 356, 357. The recessed surface 359 may be interposed between the two walls 356, 357. The two walls 356, 357 may be projecting from the recessed surface 359.

The recessed region 352 may comprise an opening 353 adjacent to a hub 330. The hub 330 may comprise a bore 332. The bore 332 may be disposed within the opening 353 of the recessed region 352 when the encoder alignment structure 301 engages the housing 312. In one embodiment, the bore 332 may be substantially similar with the bore 232 in FIG. 2. The fastener 254 shown in FIG. 2 may be used to engage the bore 332 of the hub 330 and the recessed surface 359.

The recessed region 352 may define a substantially V-shaped opening 319 on the major surface 350. The substantially V-shaped opening 319 and the opening 353 may be beneficial to allow a user to access the hub 330 and adjust a position of the hub 330 during the assembly process of the encoder system 300. The substantially V-shaped opening 319 may be limited to area around the bore 332 thereby limiting the user from accessing other elements of the encoder system 300 such as a coding member (not shown). By limiting the user from accessing other elements of the encoder system 300, the substantially V-shaped opening 319 may prevent unnecessary contamination and/or defects to the encoder system 300.

Figure 4:
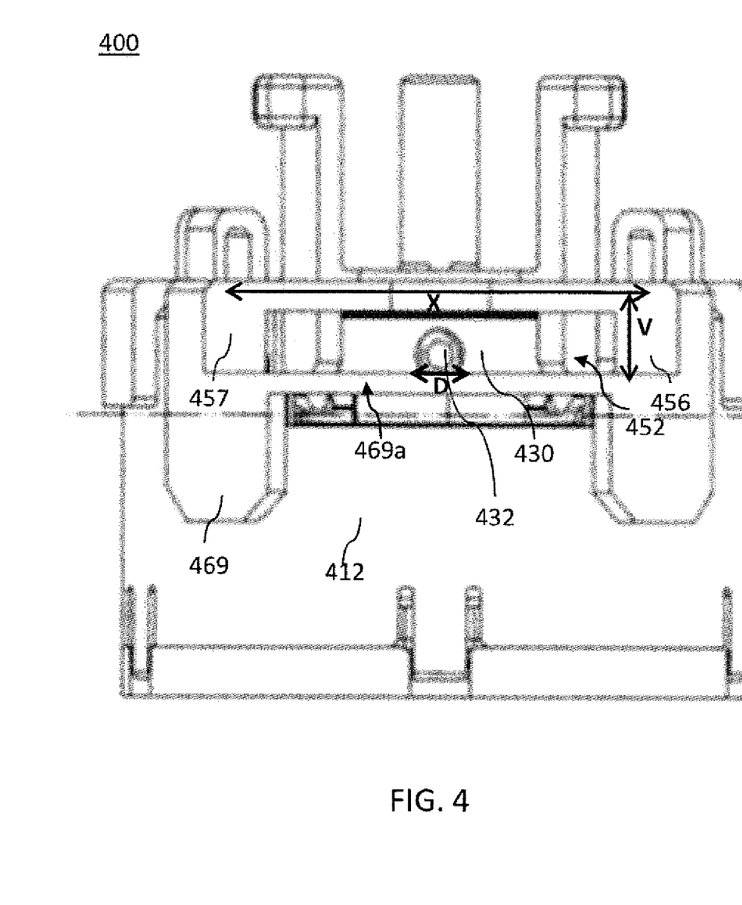
FIG. 4 illustrates a side view of an encoder system.

FIG. 4 illustrates a side view of an encoder system 400. The encoder system 400 may comprise a hub 430, two walls 456, 457, a housing 412 and a side wall 469. The hub 430 may comprise a bore 432. The bore 432 may have a diameter D. All the components of the encoder system 400 that are in common with the components of the encoder system 100, 200, 300 may be identical or may have similar characteristics. The two walls 456, 457 may be separated by a distance X. The distance X may be larger than the diameter D of the bore 432.

Each of the two walls 456, 457 may have a vertical dimension V. The vertical dimension V may be perpendicular to the distance X. The vertical dimension V of each of the two walls 456, 457 may be larger than the diameter D of the bore 432. By having the vertical dimension V and distance X larger than the diameter D of the bore 432, the hub 430 and the bore 432 may be easily accessible by a user during the assembly process of the encoder system 400.

The side wall 469 may be configured to slideably engage the housing 412. The side wall 469 may comprises a side wall opening 469a. The side wall opening 469a may be defined by the recessed region 452. The side wall opening 469a may be defined by the distance X and the vertical dimension V between the two walls 456, 457.

Figure 5:
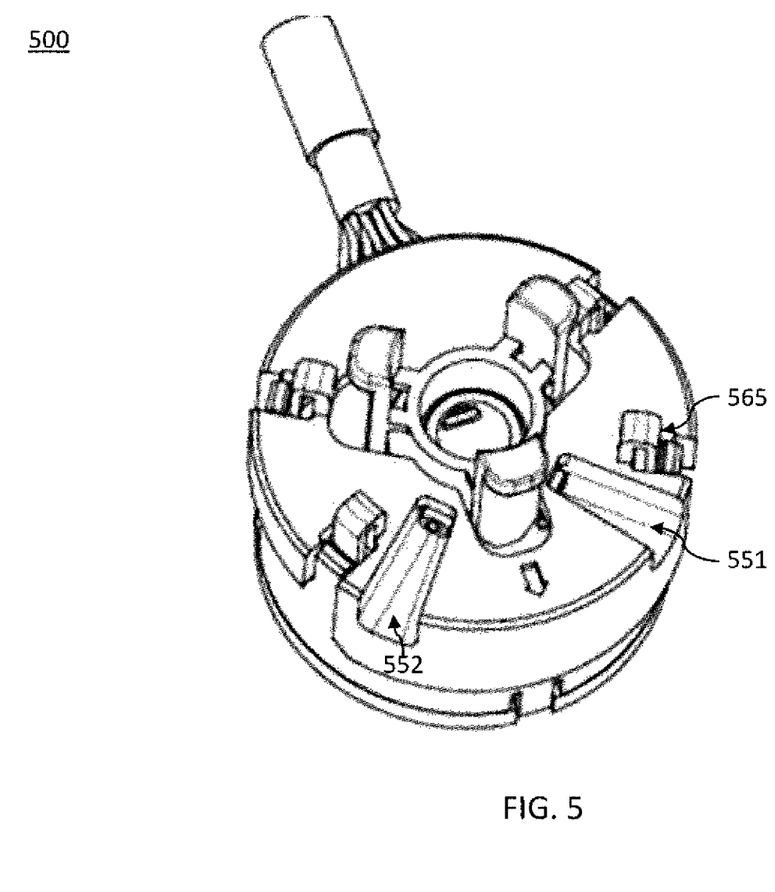
FIG. 5 illustrates a perspective view of an encoder system with an additional recessed region.

FIG. 5 illustrates a perspective view of an encoder system 500 with an additional recessed region 552. The encoder system 500 may comprise a recessed region 551 and the additional recessed region 552. The recessed region 551 and the additional recessed region 552 may be disposed between two of the plurality of catches 565.

Figure 6:
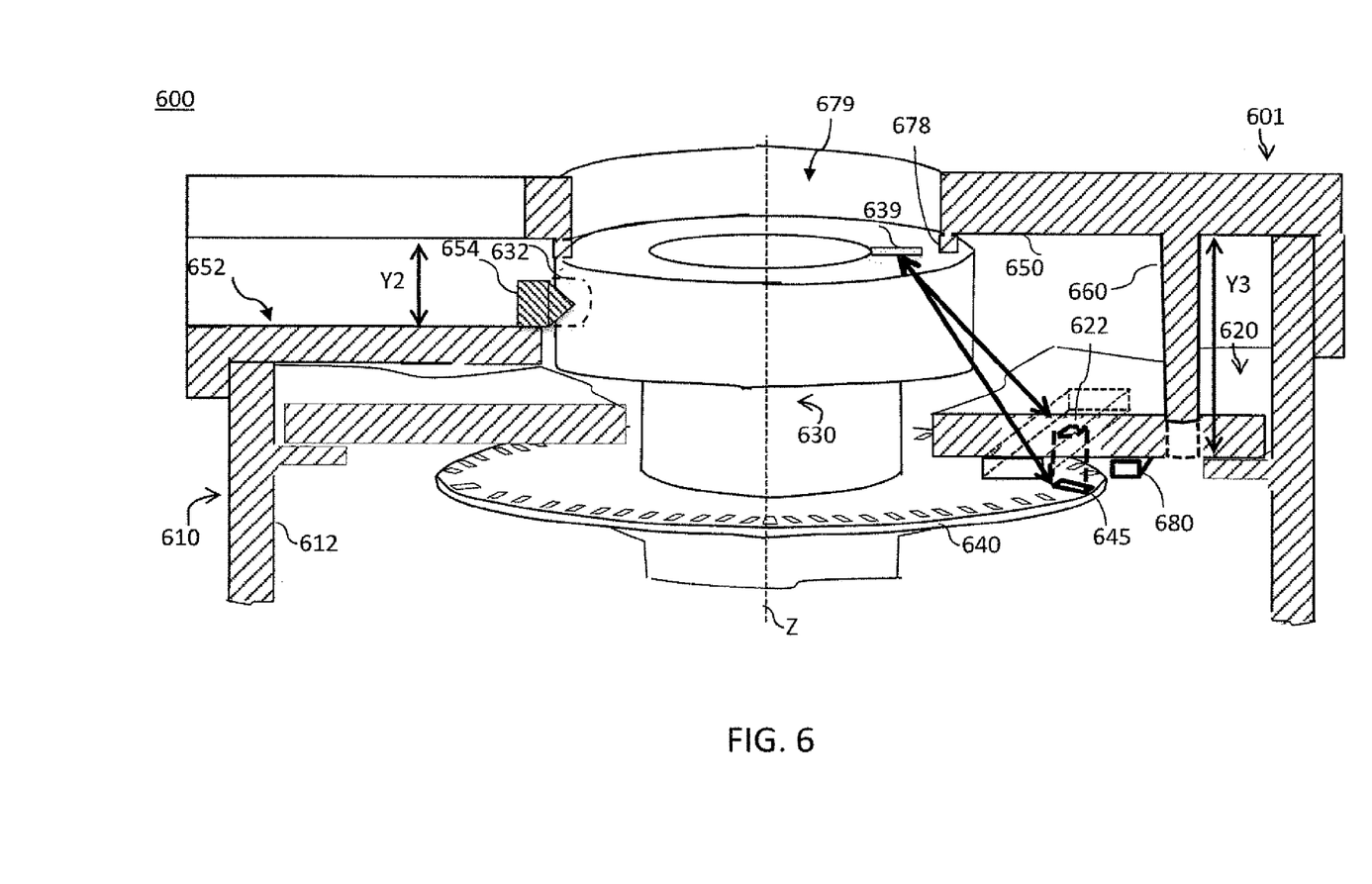
FIG. 6 illustrates a simplified perspective sectional view of an encoder system having an encoder alignment structure.

FIG. 6 illustrates a simplified perspective section view of an encoder system 600 having an encoder alignment structure 601 and an encoder assembly 610. The encoder assembly 610 may have at least a housing 612, a detector 620 having an index sensor 622, a coding member 640 having an index mark 645, a hub 630. The hub 630 may be coupled with the coding member 640. The hub 630 may have a hole 639.

The encoder alignment structure 601 may have at least a major surface 650, a collar 678, a fastener 654 and a projecting structure 660. The major surface 650 may be coupled with the housing 612. The collar 678 may be protruding from the major surface 650 and coupled with the hub 630. The major surface 650 may comprise an opening 679 on the major surface 650 adjacent to the hole 639 of the hub 630. The opening 679 on the major surface 650 may be defined by the collar 678.

The hole 639 may be arranged in a predefined radial position with respect to the coding member 640 and the detector 620 so as to align the index mark 645 with the index sensor 622. The opening 679 on the major surface 650 may be sized so that the hole 639 is disposed within the opening 679 and provide access for a user to adjust the hole 639 from the predefined radial position.

The fastener 654 may be configured to engage a depression 652 and the hub 630 so as to secure the hole 639 in the predefined radial position. The hub 630 may comprise a mating structure 632. The fastener 654 may engage the mating structure 532 when the hole 639 is in the predefined radial position.

The projecting structure 660 may have a longitudinal dimension Y3 so as to slideably engage the detector 620 when the hole 639 is in the predefined radial position. The longitudinal dimension Y3 of the projecting structure 660 may be longer than a distance Y2 between the major surface 650 and the depression 652. The distance Y2 and the longitudinal dimension Y3 may be substantially parallel to an axis of rotation Z of the hub 630. The encoder assembly 610 may comprise a light source 680. The light source 680 may be disposed adjacent to the index mark 645 when the hole 639 is arranged in the predefined radial position.

Referring to FIGS. 7A-7D, an encoder system 700 may comprise an encoder alignment structure 701, a housing 712, a hub 730, a detector 720 and a coding member 740 having an index mark 745. The encoder system 700 may share similar characteristics with the encoder system 600. The encoder alignment structure 701 may comprise a major surface 750 and a collar 778. The major surface 750 may comprise a depression 752, an additional depression 751, a perimeter 758. The hub 730 may comprise a hole 739. The collar 778 may define an opening 779 that provides access to the hole 739. All the components of the encoder system 700 that are in common with the components of the encoder system 600 may be identical or may have similar characteristics.

Figure 7A:
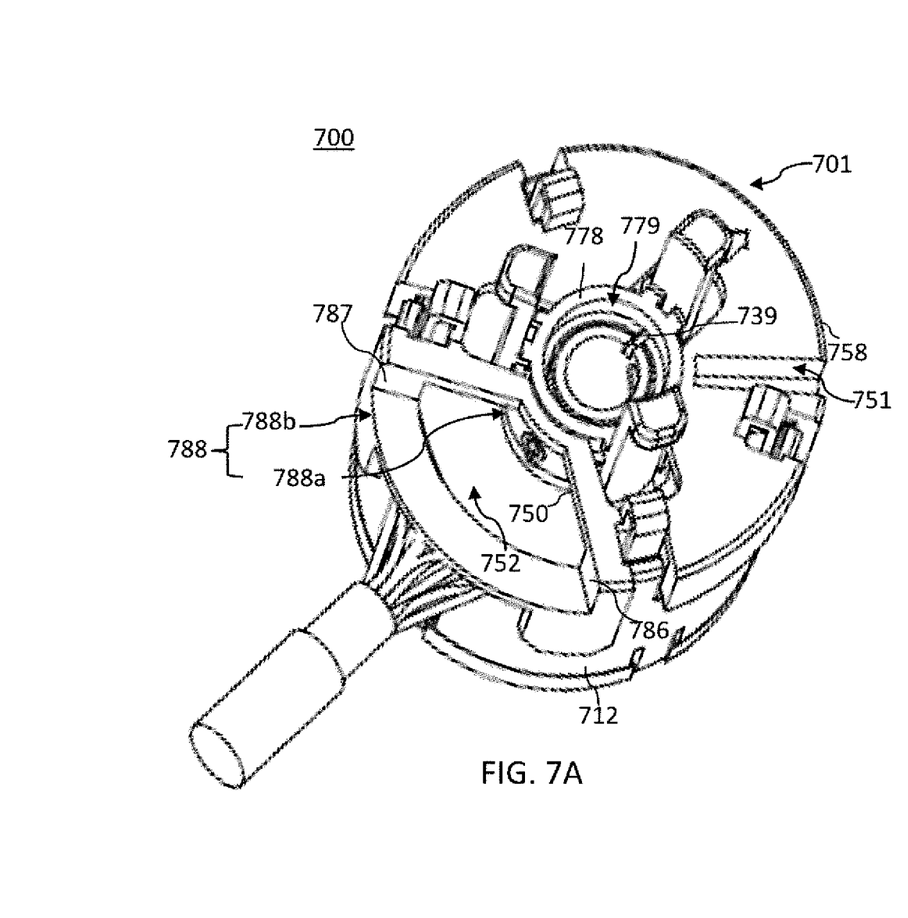
FIG. 7A illustrates a perspective view of an encoder system with a depression at the encoder alignment structure.

FIG. 7A illustrates a perspective view of the encoder system 700. The encoder alignment structure 701 may comprise first and second walls 786, 787. The first and second walls 786, 787 may protrude from the major surface 750. The first and second walls 786, 787 may form a passage 788 on the major surface 750 between the first and second walls 786, 787. The passage 788 may comprise a narrow end 788a and a wide end 788b. The wide end 788b of the passage 788 may be opening towards the perimeter 758 of the major surface 750. The depression 752 may be formed between the first and second walls 786, 787. The depression 752 may be converging from the perimeter 758 of the major surface 750 towards the hub 730.

Figure 7B:
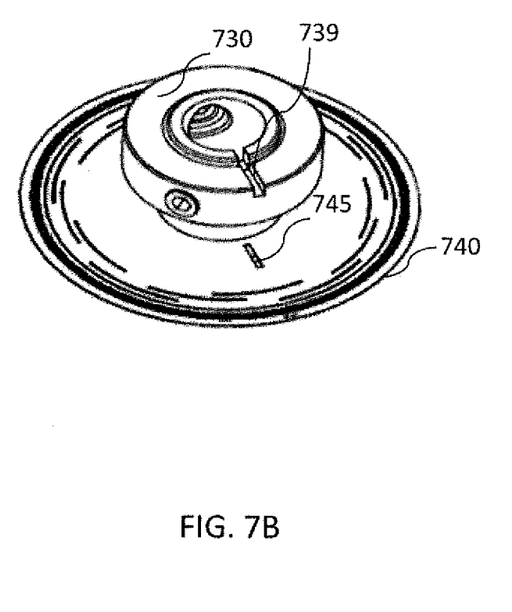
FIG. 7B illustrates a perspective view of a hub and a coding member of the encoder system illustrated in FIG. 7A.

FIG. 7B illustrates a perspective view of the hub 730 and the coding member 740 of the encoder system 700 illustrated in FIG. 7A. Referring to FIGS. 7A and 7B, the coding member 740 may be coupled with the hub 730 such that the hole 739 is aligned with the index mark 745 when the encoder alignment structure 701 engages the housing 712.

Figure 7C:
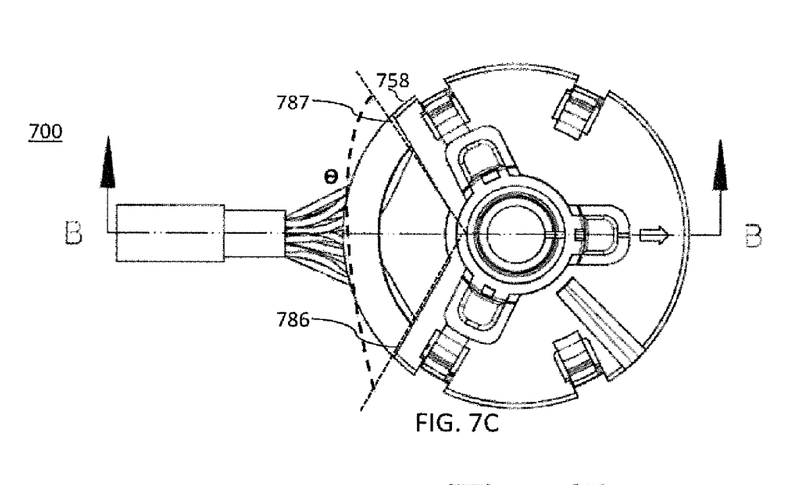
FIG. 7C illustrates a top view of the encoder system illustrated in FIG. 7A.
Figure 7D:
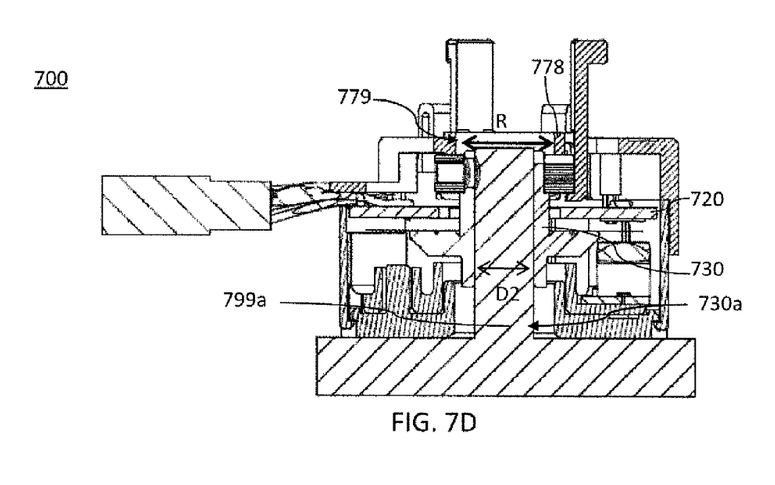
FIG. 7D illustrates a cross-sectional view of the encoder system illustrated in FIG. 7C.

Referring to FIG. 7C, the first and second walls 786, 787 may be diverging towards the perimeter 758 at an angle θ of approximately at least 10 degrees. In one embodiment, the angle θ may be approximately at most 120 degrees. FIG. 7D illustrates a cross sectional view of the encoder system 700 in FIG. 7C along a line B-B. The hub 730 may comprise a hub bore 730a. The hub bore 730a may be configured to receive a motor shaft 799a. The opening 779 may have a radial dimension R that is approximately 1.2 times to 2.5 times larger than a diameter D2 of the hub bore 730a. By having the opening 779 with a radial dimension R that is approximately 1.2 times to 2.5 times larger than a diameter D2 of the hub bore 730a, a user is able to adjust the hub 730 through the opening 779 during the assembly process of the encoder system 700. At the same time, with this range of radial dimension, the collar 778 is still coupled with the hub 730. With the collar 778 coupled with the hub 730, the hub 730 is prevented from moving away from the detector 720 and thereby maintaining the position of the hub 730 with respect to the detector 720.

Figure 8A:
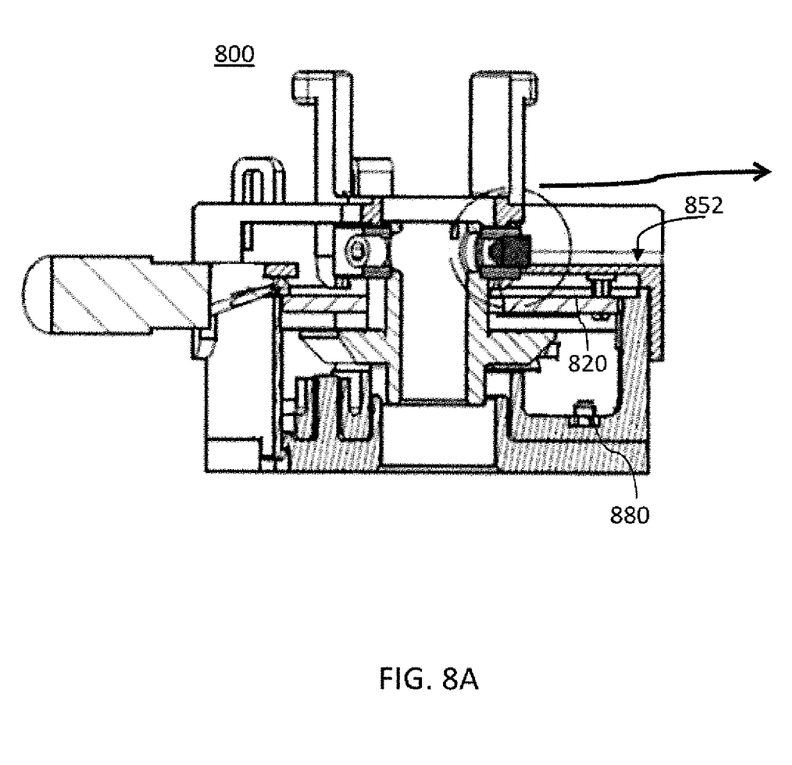
FIG. 8A illustrates a cross-sectional view of an encoder system with a fastener engaging a hub and a depression.
Figure 8B:
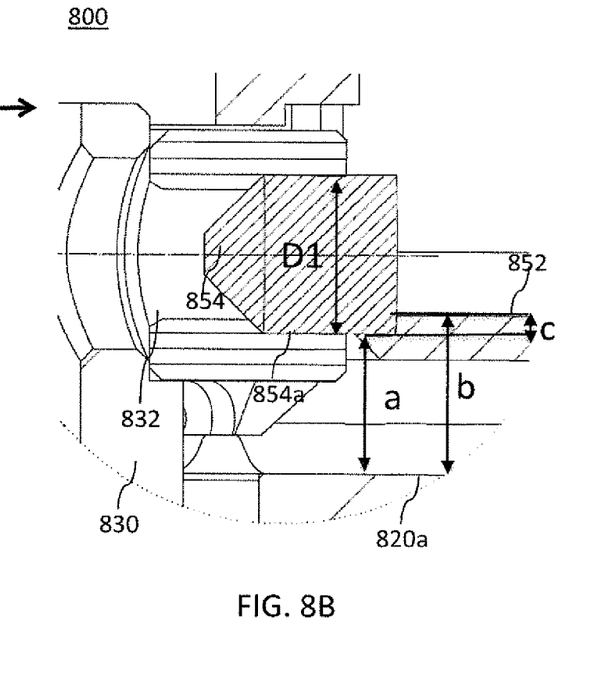
FIG. 8B illustrates a partial cross-sectional view of the encoder system illustrated in FIG. 8A.

Referring to FIGS. 8A and 8B, the encoder system 800 may comprise a depression 852, a hub 830, a detector 820, a fastener 854 and a light source 880. All the components of the encoder system 800 that are in common with the components of the encoder system 600, 700 may be identical or may have similar characteristics. FIG. 8A illustrates a cross sectional view of an encoder system 800. The depression 852 may be disposed adjacent to the detector 820 but distanced away from the light source 880.

FIG. 8B illustrates a partial cross-sectional view from a circled portion in FIG. 8A. The hub 830 may comprise a bore 832. The fastener 854 may be configured to engage the bore 832 and the depression 852. The fastener 854 may comprise an outer portion 854a. When the fastener 854 engages the depression, the outer portion 854a may be in direct contact with at least a portion of the depression 852.

The detector may comprise a major surface 820a. The outer portion 854a of the fastener 854 may be arranged at a first distance a from the major surface 820a of the detector 820. The first distance a may be substantially perpendicular to the major surface 820a of the detector 820. The depression 852 may be arranged at a second distance b from the major surface 820a of the detector 820. The second distance b may be substantially perpendicular to major surface 820a of the detector 820. The second distance b may be larger than the first distance a.

The fastener 854 may comprise a diameter D1. In one embodiment, the second distance b may be larger from the first distance by a third distance c. The third distance c may be approximately 10% to 15% of the diameter D1 of the fastener 854. By having the third distance c of approximately 10% to 15% of the diameter D1 of the fastener 854, an interference between the fastener 854 and the depression 852 may be created. The interference is created to ensure the hub 830 is secured in a position with respect to the detector 820.

Different aspects, embodiments or implementations may, but need not, yield one or more of the advantages. For example, by having the first and second walls of the encoder alignment structure diverging towards the perimeter of the major surface at an angle of approximately between 10 degrees to 120 degrees, a wide range of access to the hub may be provided for a user to adjust positions of the hub. In the same time, other elements of the encoder system such as the coding member and the detector are not exposed and still covered by the major surface of the encoder alignment structure, thereby preventing contamination to the other elements of the encoder assembly.

Although specific embodiments of the invention have been described and illustrated herein above, the invention should not be limited to any specific forms or arrangements of parts so described and illustrated. For example, the encoder assembly described above may be a transmissive encoder, a reflective encoder, an absolute encoder, an incremental encoder or any other types of encoder that utilize an index mark and index sensor. Similarly, although certain orientation terms such as "adjacent", and "distanced away", were used, the scope should not be limited to such orientation. The scope of the invention is to be defined by the claims.

What is claimed is:

1. An encoder system, comprising:
   an encoder assembly having at least:
      a housing;
      a hub configured to rotate around an axis of rotation;
      a coding member coupled to the hub; an encoder alignment structure having at least:
         a major surface having a periphery, the major surface coupled with the housing to substantially enclose the hub and the coding member;
         a plurality of catches disposed around the periphery of the major surface, the plurality of catches configured to secure the encoder alignment structure to the housing; and
         a recessed region of the major surface, the recessed region of the major surface converging from the periphery of the major surface between two of the plurality of catches towards the hub so as to provide access for a user to adjust the hub around the axis of rotation, wherein the encoder assembly comprises a detector having an index sensor, wherein the coding member comprises an index mark, wherein the recessed region of the major surface is aligned with the hub so that the index sensor is aligned with the index mark, wherein the encoder alignment structure comprises a projecting structure, and wherein the projecting structure extends from the major surface and is configured to engage the detector thereby causing the index sensor to align with the index mark.

2. The encoder system of claim 1, wherein:
   the hub comprises a bore;
   the recessed region of the major surface comprises an opening adjacent to the hub; and
   the bore is arranged to coincide with the opening of the recessed region when the index sensor is aligned with the index mark.

3. The encoder system of claim 1 further comprising a fastener, wherein the fastener is configured to engage the hub and the recessed region when the index sensor is aligned with the index mark.

4. The encoder system of claim 1, wherein the detector comprises a printed circuit board, and the recessed region is adjacent to the printed circuit board but distanced away from the coding member.

5. The encoder system of claim 1, wherein the recessed region comprises a recessed surface substantially parallel to the major surface and two walls projecting from the recessed surface.

6. The encoder system of claim 5, wherein the hub comprises a bore having a diameter and the two walls are separated by a distance larger than the diameter of the bore.

7. The encoder system of claim 1, wherein:
   the encoder alignment structure comprises a side wall configured to slideably engage the housing; and
   the side wall comprises a side wall opening defined by the recessed region.

8. The encoder system of claim 1, wherein the recessed region defines a substantially V-shaped opening on the major surface.

9. An encoder system, comprising:
   an encoder assembly having at least:
      a housing;
      a detector having an index sensor;
      a coding member having an index mark;
      a hub coupled with the coding member and having a hole;
      an encoder alignment structure having at least: a major surface coupled with the housing;
      a collar protruding from the major surface and coupled with the hub; and
      an opening on the major surface adjacent to the hole of the hub and defined by the collar;
      wherein the hole is arranged in a predefined radial position with respect to the coding member and the detector so as to align the index mark with the index sensor;
      wherein the opening on the major surface is sized so that the hole is disposed within the opening and provide access for a user to adjust the hole from the predefined radial position, wherein the major surface comprises a perimeter and a depression, wherein the depression is converging from the perimeter of the major surface towards the hub, and wherein the encoder assembly comprises a light source and the depression is disposed adjacent to the detector but distanced away from the light source.

10. The encoder system of claim 9, wherein:
    the hub comprises a hub bore configured to receive a motor shaft; and the opening on the major surface has a radial dimension that is approximately 1.2 times to 2.5 times larger than a diameter of the hub bore.

11. The encoder system of claim 9, wherein:
the encoder alignment structure further comprises a fastener; and
the fastener is configured to engage the depression and the hub so as to secure the hole in the predefined radial position.

12. The encoder system of claim 11, wherein:
the fastener comprises an outer portion in direct contact with at least a portion of the depression;
the detector has a major surface;
the outer portion of the fastener is arranged at a first distance substantially perpendicular to the major surface of the detector;
the depression is arranged at a second distance substantially perpendicular to major surface of the detector; and
the second distance is larger than the first distance.

13. The encoder system of claim 9, wherein:
the encoder alignment structure further comprises a projecting structure;
the projecting structure has a longitudinal dimension so as to slideably engage the detector in the predefined radial position; and
the longitudinal dimension of the projecting structure is longer than a distance between the major surface and the depression.

14. The encoder system of claim 9, wherein the encoder assembly comprises a six-channel encoder.

15. An encoder system, comprising:
an encoder assembly having at least:
a housing;
a hub configured to rotate around an axis of rotation;
a coding member coupled to the hub; an encoder alignment structure having at least:
a major surface having a periphery, the major surface coupled with the housing to substantially enclose the hub and the coding member;
a plurality of catches disposed around the periphery of the major surface, the plurality of catches configured to secure the encoder alignment structure to the housing; and
a recessed region of the major surface, the recessed region of the major surface converging from the periphery of the major surface between two of the plurality of catches towards the hub so as to provide access for a user to adjust the hub around the axis of rotation, wherein the encoder assembly comprises a detector having an index sensor, wherein the coding member comprises an index mark, wherein the recessed region of the major surface is aligned with the hub so that the index sensor is aligned with the index mark, wherein the detector comprises a printed circuit board, and wherein the recessed region is adjacent to the printed circuit board but distanced away from the coding member.

16. The encoder system of claim 15, wherein:
the hub comprises a bore;
the recessed region of the major surface comprises an opening adjacent to the hub; and
the bore is arranged to coincide with the opening of the recessed region when the index sensor is aligned with the index mark.

17. The encoder system of claim 15, wherein the encoder assembly comprises a six-channel encoder.

18. The encoder system of claim 15, wherein the encoder alignment structure comprises a projecting structure and wherein the projecting structure extends from the major surface and is configured to engage the detector thereby causing the index sensor to align with the index mark.

19. The encoder system of claim 15, wherein:
the hub comprises a bore;
the recessed region of the major surface comprises an opening adjacent to the hub; and
the bore is arranged to coincide with the opening of the recessed region when the index sensor is aligned with the index mark.

20. The encoder system of claim 15, further comprising a fastener, wherein the fastener is configured to engage the hub and the recessed region when the index sensor is aligned with the index mark.

* * * * *